(12) United States Patent
Dailey et al.

(10) Patent No.: US 9,047,452 B2
(45) Date of Patent: Jun. 2, 2015

(54) MULTI-USER BIOS AUTHENTICATION

(75) Inventors: James E. Dailey, Round Rock, TX (US);
Alok Pant, Cedar Park, TX (US);
Benjamen G. Tyner, Austin, TX (US);
Kendall C. Witte, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1392 days.

(21) Appl. No.: 11/428,856

(22) Filed: Jul. 6, 2006

(65) Prior Publication Data
US 2008/0022367 A1 Jan. 24, 2008

(51) Int. Cl.
*G06F 21/00* (2013.01)
*G06F 21/32* (2013.01)
*G06F 21/34* (2013.01)
*G06F 21/31* (2013.01)

(52) U.S. Cl.
CPC ............... *G06F 21/32* (2013.01); *G06F 21/31* (2013.01); *G06F 21/34* (2013.01)

(58) Field of Classification Search
CPC .......... G06F 21/31; G06F 21/32; G06F 21/34
USPC ........ 726/2, 9, 14, 19, 36, 4, 16, 17; 713/1, 2, 713/26, 185, 186, 182
See application file for complete search history.

(56) References Cited

U.S. PATENT DOCUMENTS

| | | | |
|---|---|---|---|
| 5,388,267 A | 2/1995 | Chan et al. | 395/700 |
| 5,448,045 A * | 9/1995 | Clark | 235/382 |
| 5,892,906 A * | 4/1999 | Chou et al. | 726/19 |
| 5,960,084 A * | 9/1999 | Angelo | 713/185 |
| 6,353,885 B1 | 3/2002 | Herzi et al. | 713/1 |
| 6,397,337 B1 * | 5/2002 | Garrett et al. | 726/19 |
| 6,438,688 B1 | 8/2002 | Nunn | 713/2 |
| 6,510,512 B1 | 1/2003 | Alexander | 713/2 |
| 6,640,316 B1 | 10/2003 | Martin et al. | 714/36 |
| 6,934,546 B1 | 8/2005 | Corbett et al. | 455/441 |
| 6,986,034 B2 | 1/2006 | Tyner et al. | 713/2 |
| 7,000,101 B2 | 2/2006 | Wu et al. | 713/1 |
| 2001/0032319 A1 * | 10/2001 | Setlak | 713/201 |
| 2003/0084352 A1 * | 5/2003 | Schwartz et al. | 713/202 |
| 2004/0139332 A1 * | 7/2004 | Lim | 713/185 |
| 2005/0065817 A1 * | 3/2005 | Mihai et al. | 705/2 |
| 2005/0109841 A1 * | 5/2005 | Ryan et al. | 235/380 |
| 2005/0193188 A1 * | 9/2005 | Huang | 713/1 |
| 2006/0026672 A1 * | 2/2006 | Braun | 726/9 |

* cited by examiner

*Primary Examiner* — Brandon Hoffman
*Assistant Examiner* — Thong Truong
(74) *Attorney, Agent, or Firm* — Terrile, Cannatii, Chambers & Holland, LLP; Stephen A. Terrile

(57) ABSTRACT

An information handling system which supports Pre-Boot Authentication (PBA) and which provides the ability for each authorized user of the system to have a unique ID and key at the BIOS level. In these systems, a user only needs knowledge of the traditional BIOS password only at the time the user is enrolled in the PBA feature. Later changes to the password do not have the effect of denying access to enrolled users.

9 Claims, 3 Drawing Sheets

MULTI-USER BIOS AUTHENTICATION

BACKGROUND OF THE INVENTION

1. Field of the Invention

The present invention relates to information handling systems and more particularly to multi-user BIOS authentication within an information handling system.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to provide a simple password mechanism within a basic input output system (BIOS) of an information handling system to prohibit unauthorized users from accessing the information handling system. Anyone who wanted access to the system would have to share the password.

For example, FIG. 1, labeled Prior Art, shows a flow chart of a BIOS authentication operation. When the authentication operation starts, the BIOS is checked to determine whether a BIOS password is set. If not, then access to the information handling system is allowed. If the BIOS password is set, then the information handling system prompts the user to enter the password and the password is checked to determine whether it is correct. If the password is correct, then access to the information handling system is allowed. If the password is incorrect, then access to the information handling system is denied.

Typically, one of the users could change the password and thereby deny access to previously authorized users. In a corporate environment, this type of behavior is generally undesirable.

SUMMARY OF THE INVENTION

In accordance with the present invention, information handling systems are provided which support Pre-Boot Authentication (PBA) and which provide the ability for each authorized user of the system to have a unique ID and key at the BIOS level. In these systems, a user needs knowledge of the traditional BIOS password only at the time the user is enrolled in the PBA feature. Later changes to the password will not have the effect of denying access to enrolled users.

Furthermore, the multi-user authentication feature can also be applied to the password (if any) on the system's primary hard disk drive (and could be expanded to include other hard disk drives as well).

Such a multi-user authentication feature is especially useful in that BIOS authentication within the PBA feature is typically done by scanning a fingerprint or presenting a smartcard to the BIOS. Hence, a PBA user only ever needs to know the BIOS (or HDD) password when they are enrolling for PBA (and even that knowledge can be withheld from the user if an administrator supplies the password at enrollment time). If the password is later changed, the PBA user is still able to access the system with their smartcard or finger scan.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
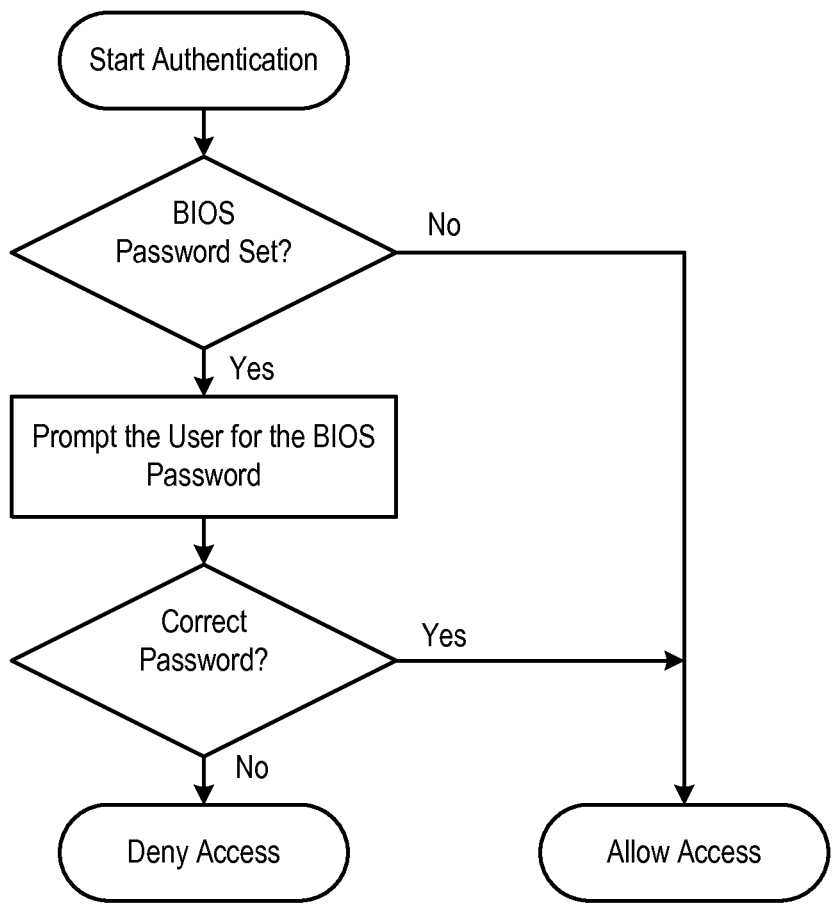
FIG. 1, labeled Prior Art, shows a flow chart of a BIOS authentication operation.
Figure 2:
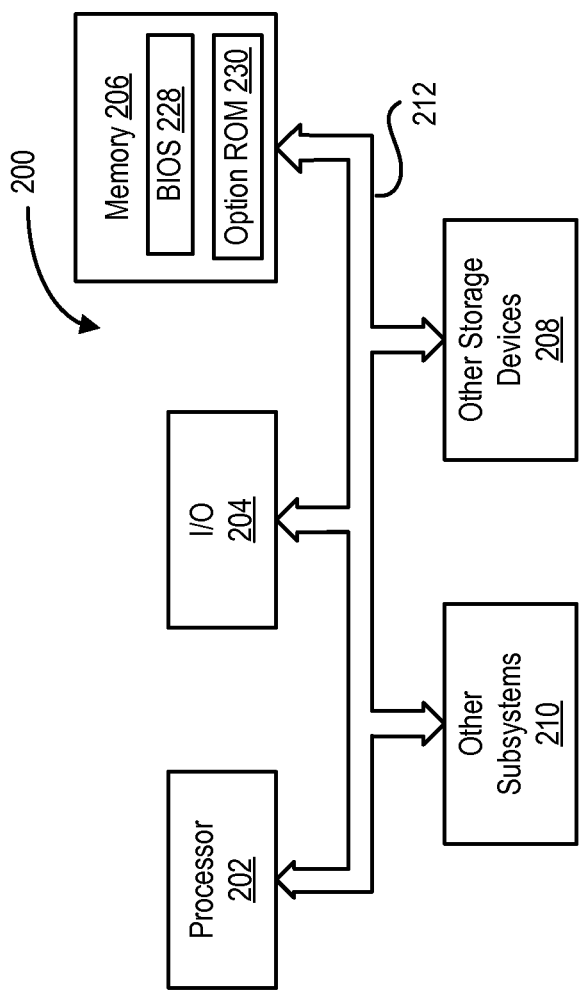
FIG. 2 shows a system block diagram of an information handling system.

Referring briefly to FIG. 2, a system block diagram of an information handling system 200 is shown. The information handling system 200 includes a processor 202, input/output (I/O) devices 204, such as a display, a keyboard, a mouse, and associated controllers, memory 206, including volatile memory such as random access memory (RAM) and non-volatile memory such as read only memory (ROM) and hard disk drives, and other storage devices 208, such as a floppy disk and drive or CD-ROM disk and drive, and various other subsystems 210, all interconnected via one or more buses 212. The memory 206 includes a basic input output system 228 as well as a Pre-Boot Authentication module 230.

The PBA module 230 enables each authorized user of the system to have a unique ID and key at the BIOS level. Thus, each authorized user needs the knowledge of the BIOS password only at the time the user is enrolled in the PBA feature. Later changes to the password do not have the effect of denying access to enrolled users.

The multi-user authentication module 230 can also be use to apply password protection on other memory 206 of the information handling system 200 such as a primary hard disk drive and as well as other hard disk drives within the information handling system 200.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 3:
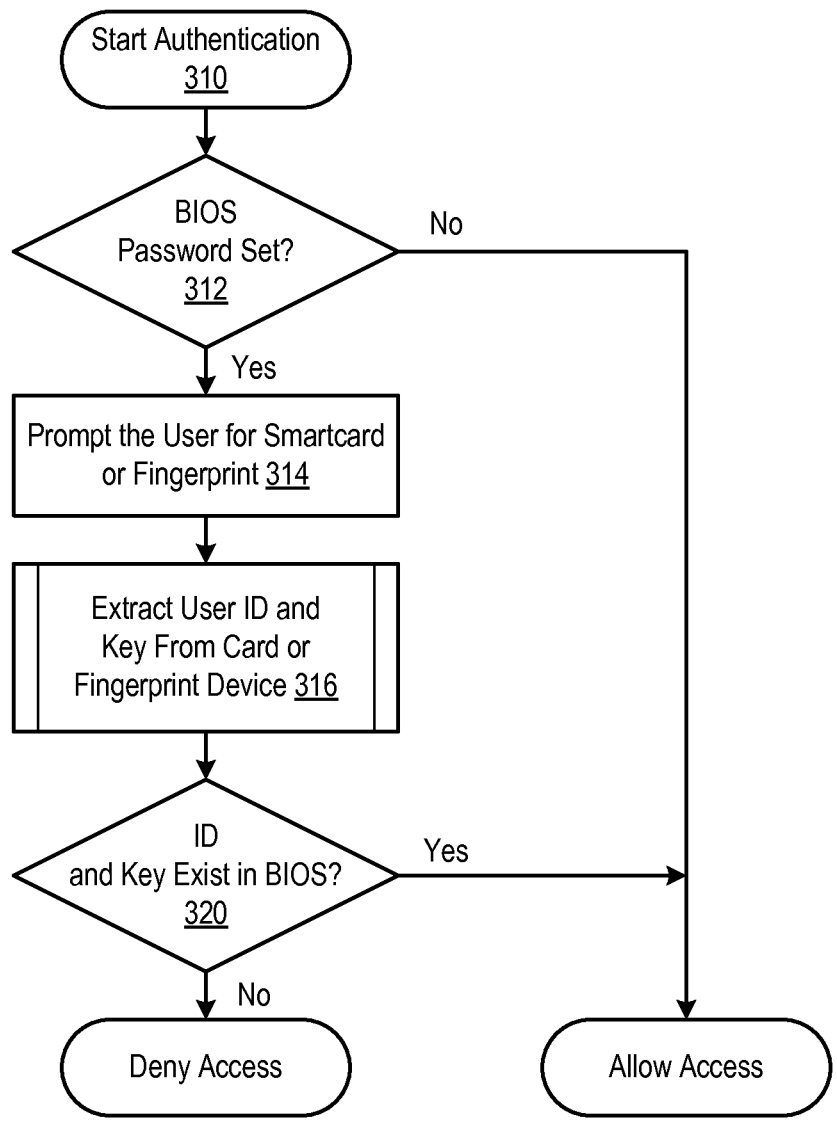
FIG. 3 shows a flow chart of the operation of a multi-user BIOS authentication.

Referring to FIG. 3, a flow chart of the operation of a multi-user BIOS authentication module 230 is shown.

When the authentication operation starts at step 310, the BIOS is checked to determine whether a BIOS password is set at step 312. If not, then access to the information handling system is allowed. If the BIOS password is set, then the authentication module 230 prompts the user to provide identification information at step 314. For example, the identification information can include a fingerprint or a smart card. The authentication module 230 then generates a user identifier and key from the identification information at step 316. The user identifier can be extracted directly from the identification information, as is the case with a smart card for example, or can be derived from the identification information, as is the case with a scan of a fingerprint for example.

BIOS is then searched to determine whether the user identifier and key are present at step 320. If the user identifier and key are present, then access to the information handling system is allowed. If the user identifier and key are not present, then access to the information handling system is denied.

Such a multi-user authentication feature is especially useful in that BIOS authentication within the PBA feature is typically done by scanning a fingerprint or presenting a smartcard to the BIOS. Hence, a PBA user only ever needs to know the BIOS (or HDD) password when they are enrolling for PBA (and even that knowledge can be withheld from the user if an administrator supplies the password at enrollment time). If the password is later changed, the PBA user is still able to access the system with their smartcard or finger scan.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for performing a multi-user pre-boot authentication process for an information handling system comprising:

determining, by a computer, whether a pre-boot authentication password is set when accessing the information handling system;

prompting a user of a plurality of users to provide identification information;

determining whether information based upon the identification information is present within the information handling system;

allowing access to the information handling system if the information based upon the identification information is present, the access being allowed even if a hard disk drive password is later changed; and wherein the information based upon the identification information is stored within a basic input output system (BIOS) of the information handling system;

a user identifier and a key are either derived or extracted from the identification information;

the user identifier and the key are stored within the BIOS for users authorized to access the information handling system; and, at the time of the pre-boot authentication, an administrator supplies the hard disk drive password and knowledge of the hard disk drive password is withheld from the user of the plurality of users.

2. The method of claim 1 wherein
   the identification information includes a smart card.

3. The method of claim 1 wherein
   the identification information includes a fingerprint.

4. An apparatus for performing a multi-user pre-boot authentication process for an information handling system comprising:

means for determining whether a pre-boot authentication password is set when accessing the information handling system;

means for prompting a user of a plurality of users to provide identification information;

means for determining whether information based upon the identification information is present within the information handling system;

means for allowing access to the information handling system if the information based upon the identification information is present, the access being allowed even if a hard disk drive password is later changed; and wherein the information based upon the identification information is stored within a basic input output system (BIOS) of the information handling system;

a user identifier and a key are either derived or extracted from the identification information;

the user identifier and the key are stored within the BIOS for users authorized to access the information handling system; and, at the time of the pre-boot authentication, an administrator supplies the hard disk drive password and knowledge of the hard disk drive password is withheld from the user of the plurality of users.

5. The apparatus of claim 4 wherein
   the identification information includes a smart card.

6. The apparatus of claim 4 wherein the identification information includes a fingerprint.

7. An information handling system comprising:
- a processor;
- a memory coupled to the processor, the memory storing an authentication system for performing a multi-user pre-boot authentication process, the authentication; system including instruction for
  - determining whether a password is set when accessing the information handling system
  - prompting a user of a plurality of users to provide identification information;
  - determining whether information based upon the identification information is present within the information handling system;
  - allowing access to the information handling system if the information based upon the identification information is present, the access being allowed even if a hard disk drive password is later changed; and wherein
  - the information based upon the identification information is stored within a basic input output system (BIOS) of the information handling system;
  - a user identifier and a key are either derived or extracted from the identification information;
  - the user identifier and the key are stored within the BIOS for users authorized to access the information handling system; and,
  - at the time of the pre-boot authentication, an administrator supplies the hard disk drive password and knowledge of the hard disk drive password is withheld from the user of the plurality of users.

8. The information handling system of claim 7 wherein the identification information includes a smart card.

9. The information handling system of claim 7 wherein the identification information includes a fingerprint.

* * * * *